United States Patent [19]
Dzenis

[11] Patent Number: 6,079,323
[45] Date of Patent: Jun. 27, 2000

[54] APPARATUS AND METHOD FOR MAKING CHEESE

[76] Inventor: Visvaldis Dzenis, 100 Hawthorne Ave., Bloomfield, N.J. 07003

[21] Appl. No.: 09/210,405

[22] Filed: Dec. 11, 1998

[51] Int. Cl.[7] .............................. A23C 1/00; A23C 19/00
[52] U.S. Cl. ................................ 99/454; 99/458; 99/456; 426/582; 426/522
[58] Field of Search ............................. 99/456, 458, 453, 99/452, 454; 426/582, 522

[56] References Cited

U.S. PATENT DOCUMENTS

| | | |
|---|---|---|
| 1,428,602 | 9/1922 | Malekow . |
| 1,522,384 | 1/1925 | Parsons et al. . |
| 1,523,678 | 1/1925 | Wheeler et al. . |
| 1,588,061 | 6/1926 | Spielman . |
| 1,861,721 | 6/1932 | Scott . |
| 1,862,563 | 6/1932 | Bell . |
| 1,993,264 | 3/1935 | Duttweiler . |
| 2,083,322 | 6/1937 | Duttweiler . |
| 2,091,606 | 8/1937 | Murray . |
| 2,096,529 | 10/1937 | Sizer . |
| 2,682,827 | 7/1954 | Gressly . |
| 2,794,746 | 6/1957 | Schwartz ................................... 99/456 |
| 2,840,909 | 7/1958 | Dzenis . |
| 2,982,655 | 5/1961 | Budd et al. . |
| 3,101,540 | 8/1963 | Dzenis . |
| 3,500,542 | 3/1970 | Roiner ....................................... 99/458 |
| 4,044,662 | 8/1977 | Savarese .................................... 99/460 |
| 4,112,131 | 9/1978 | Bosy et al. ............................... 426/582 |
| 4,131,688 | 12/1978 | Grosclaude et al. ....................... 426/40 |
| 4,145,453 | 3/1979 | Lenhardt, Sr. ........................... 426/516 |
| 4,160,002 | 7/1979 | Janovtchik ................................. 261/76 |
| 4,212,617 | 7/1980 | Bagdan et al. ........................... 425/311 |
| 4,422,372 | 12/1983 | Hoezee ...................................... 99/353 |
| 4,976,980 | 12/1990 | Yntema ..................................... 426/495 |
| 5,572,925 | 11/1996 | Van Pay et al. ............................ 99/454 |

*Primary Examiner*—Reginald L. Alexander
*Attorney, Agent, or Firm*—John G. Gilfillan, III; William Squire

[57] ABSTRACT

An inner vertically upright perforated conduit is concentric within an outer vertically upright conduit. The chamber between the conduits is separated by fluid impervious rings forming sub-chambers. Hot curd cooking water is injected into the various sub-chambers in controlled amounts through corresponding valves to provide cheese at 135° F. at the bottom exit port of the cheese passageway formed by the inner conduit. The water and curd/cheese together form a pressure head of at least about 2 psi at the bottom of the conduits. Raw curd is fed in a continuous process to the top of the inner conduit producing finished cheese at the bottom without moving parts. A shredder at the bottom automatically shreds the cheese. The shredder includes a rotating blade with blow out apertures for ejecting shredded cheese from a fixed shredding plate. The shredded cheese is automatically cooled and salted in a single continuous process.

27 Claims, 5 Drawing Sheets

APPARATUS AND METHOD FOR MAKING CHEESE

This invention relates to apparatus and methods for processing curd for making Italian cheese such as mozzarella and provolone and so on and more particularly, to continuously produce such cheese.

Cheeses are made from milk which is heated and to which a rennet is added to form a raw curd. So called American cheeses and others are made by compacting the curd into cheese blocks which then can be cut into smaller blocks. The blocks then are cured over a period of several months to form the final cheese. For example, see U.S. Pat. No. 5,572,925 disclosing a tower arrangement for compressing and compacting the curd to form American cheese blocks.

Italian cheeses such as mozzarella or provolone are made differently. Mozzarella and provolone are made with a cheese dough referred to as pasta filata. In this process, the curd is allowed to reach a desired acidity. This curd is then heated by hot water of about 160° F. to form the cheese dough-pasta filata. The pasta filata is either molded manually or delivered with augers to a mold to form various size cheese blocks.

Commonly owned U.S. Pat. No. 3,101,540 ('540) discloses an apparatus for making such Italian cheeses. The prior art as disclosed therein for making such cheeses includes providing raw curd made from milk, curing the curd, mixing and stretching the cured curd to produce a homogenous plastic, stretchy mass of cheese dough for making cheese. The cheese dough is then molded into items of desired shape and size. Prior art devices are described as manually or semi-manually operated. They require manual chopping, tearing or cutting by hand small pieces or portions of the main portion of the plastic curd and then modifying this irregular, unmolded cheese into a compact, smooth commercial shape which is sealed and formed with a skin.

There are prior automatic processes for making mozzarella cheese in portions of one pound or less. However, the manufacture of cheese in larger portions was previously done exclusively by hand. Automated devices are described as being unsuccessful in the prior art because mechanical devices for automatically making such cheese must make cheese of equal quality or superior to hand made product.

There is thus disclosed in the above noted patent an apparatus for automatically and continuously making larger portions of such cheeses. The disclosed apparatus employs a pair of parallel augers. A hopper is loaded with cured cheese curd. The curd is picked up by the augers and conveyed by the augers. The kneading of the curd by the rotating augers is stated to provide improved pasta filata. Whey is removed during conveying and is drained from the housing containing the augers. Of interest is commonly owned U.S. Pat. No. 2,840,909 of which the '540 patent is an improvement. The '909 patent also discloses a pair of augers for conveying the curd product.

The problem with augers is that augers may over or under work the product, producing a variation in the final cheese. The augers may produce a variation in pressure which is not desirable. In auger systems, cream, i.e., water and butterfat, may be excessively removed from the curd. This results in lower yield.

The present inventor recognizes a need for an improved Italian cheese making process, i.e., apparatus which provides high quality cheese with maximum yield with a simple apparatus that is easy to clean rapidly.

A cheese producing apparatus according to the present invention comprises conduit means for receiving acidified curd, the conduit means for passively conveying the received curd though the conduit means without moving parts and means coupled to the conduit means for cooking the curd during the conveying to produce pasta filata.

In one aspect, the conduit means includes at least one vertically oriented conduit for providing a gravity induced pressure head of the curd in a column in the at least one conduit to cause the curd to vertically downwardly displace in response to the pressure head.

In a further aspect, the at least one conduit comprises an outer cylindrical conduit and an inner perforated cylindrical conduit within and spaced from the outer conduit, the inner conduit comprising a tubular perforated pasta filata forming chamber for receiving the curd and means coupled to the outer conduit for orienting the inner and outer conduits vertical.

In a still further aspect, the conduits have an upper end and a lower end, the means for cooking including hot water inlet means for receiving hot water intermediate the ends in the outer conduit for cooking the curd in the inner conduit and water outlet means situated at a vertically higher elevation than the inlet means.

Preferably, the at least one conduit has a length sufficient to produce a pressure head of at least about 2 psi.

In a further aspect, the inner and outer conduits form an annular chamber therebetween, further including fluid impervious means in the annular chamber for dividing the annular chamber into a vertical array of annular sub-chambers, the sub-chambers each for receiving hot water. In a further aspect, the inlet means includes means for injecting the hot water into selected ones of the sub-chambers. Preferably the hot water has a temperature of about 160° F.

Means are preferably coupled to the conduits for insuring injected hot water passes through the inner conduit perforations into the inner conduit chamber in order to flow to the outlet means.

In a further aspect, the hot water injection means comprises a manifold for receiving the hot water and a plurality of manifold outlets, each manifold outlet for supplying hot water to a corresponding sub-chamber. Preferably, means are provided for adjustably setting the amount of water flowing through each the manifold outlets.

In a still further aspect, for the production of mini-portion cheese or shredded cheese, cheese shredding means are connected to the conduit means for depositing the pasta filata in small cavities as the cheese is produced to form a continuous process.

The cheese shredding means may include a cheese receiving chamber for continuously receiving a moving mass of produced cheese, a fixed perforated plate of a given thickness and having perforations of a given transverse area for receiving, i.e., depositing the cheese passing into the plate perforations, a rotatably mounted blade in the chamber adjacent to the perforated plate for severing the moving cheese mass in the bulk cheese from the received cheese in the plate perforations and a further plate external the cheese receiving chamber with a slot aligned with the blade, and means for synchronously rotating the blade and the further plate.

Preferably, the blade includes fluid conduits, each for successive alignment with a different perforation in the perforated plate as the blade rotates, and further including fluid means for causing fluid streams to flow through the blade fluid conduits and aligned perforations to eject the received shredded cheese from the fixed perforated plate perforations.

In a further aspect the apparatus includes cooling means for cooling the cooked shredded cheese comprising a trough for receiving the shredded cheese, means for flowing water through the trough for cooling the shredded cheese, first means for conveying the cooled shredded cheese from the trough, second conveying means for receiving and conveying the cooled cheese, and brine spray means for salting the cooled cheese during conveying by the second means.

A cheese shredding apparatus according to a further aspect of the present invention comprises a housing forming a chamber for receiving a moving mass of cheese; a perforated plate of a given thickness and having perforations each of a given transverse area secured to the housing for receiving and shredding cheese from the chamber, the thickness and area defining the mass of the shredded cheese particles; a blade rotatably secured to the housing in the chamber and adjacent to the perforated plate for severing the cheese mass in the chamber from the received cheese in the perforations; a second plate external the chamber adjacent to the perforated plate, the second plate having a slot therein aligned with the blade for receiving shredded cheese passing through the perforated plate; and means for synchronously rotating the blade and second plate.

A method for producing cheese according to a further aspect comprises passively conveying received acidified curd though a conduit without moving parts and cooking the curd during the conveying to produce pasta filata from the curd.

The method preferably includes continuously conveying the curd and continuously producing the pasta filata.

The method may include shredding the pasta filata as it is being produced.

In a further aspect, the method includes continuously cooling the shredded pasta filata during the shredding.

The method preferably also includes continuously salting the shredded cooled pasta filata.

Figures 1, 6:
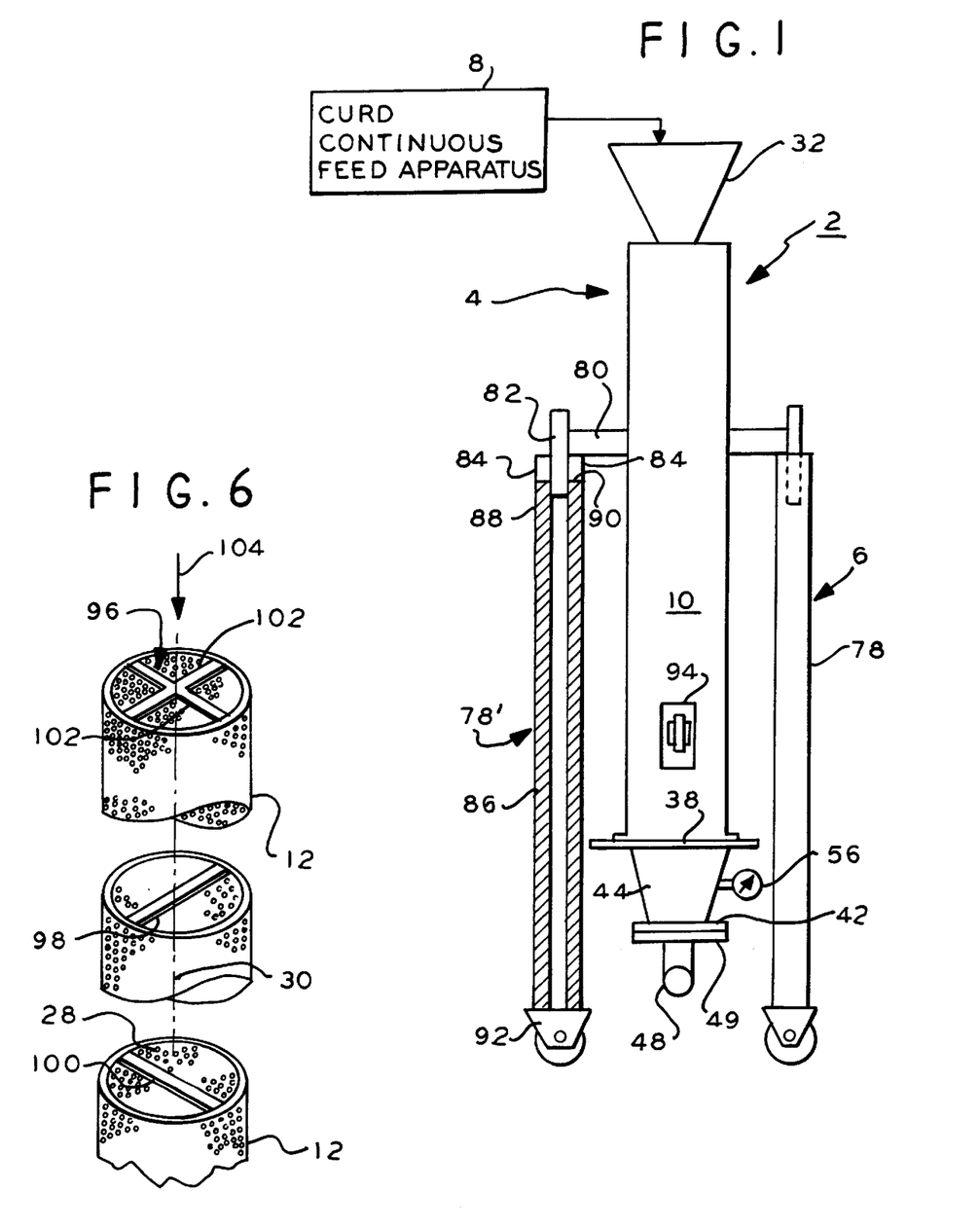
FIG. 1 is a partially diagrammatic fragmented side elevation view partially in section of an apparatus according to an embodiment of the present invention.
FIG. 6 is an exploded fragmented view of an alternate embodiment of a perforated inner conduit for use in the embodiment of FIG. 1.
Figures 2, 2A:
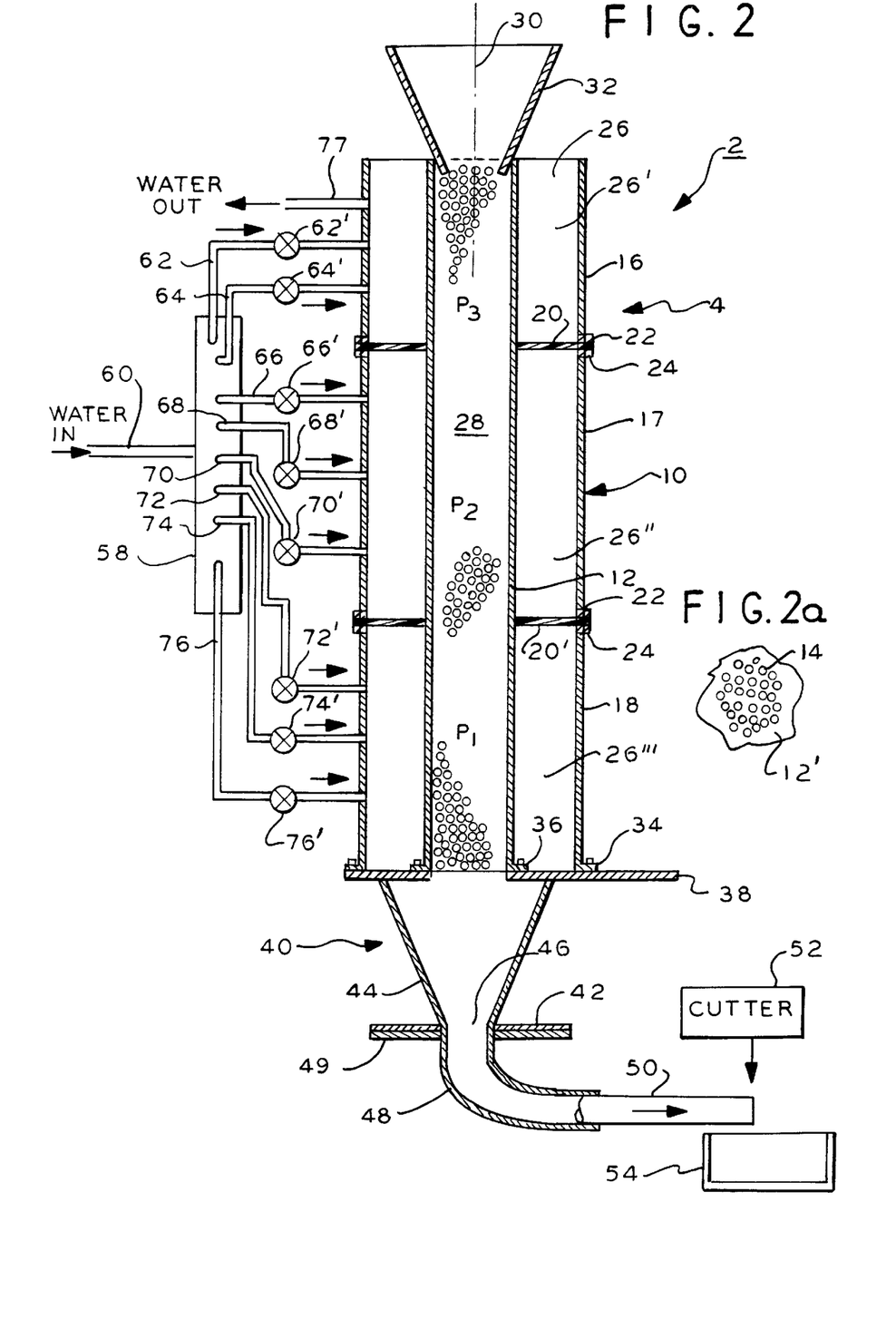
FIG. 2 is a fragmented sectional elevation view of the apparatus of FIG. 1.
FIG. 2a is a plan view of a portion of a perforated inner conduit of the embodiment of FIGS. 1 and 2.

In FIGS. 1 and 2, Italian cheese making apparatus 2 comprises cheese making assembly 4 and support structure 6 for supporting the assembly 4 in the upright vertical orientation shown. The apparatus 2 makes Italian cheeses such as mozzarella, provolone and so on. As mentioned in the introductory portion such cheeses comprise raw curd made by heating milk and adding a coagulation agent rennet until curds and whey are formed. This properly acidified raw curd material is then fed by an automated feed apparatus 8 to the cheese making apparatus 2. The feed apparatus 8 is conventional and may be provided by one of ordinary skill in the machine fabrication art.

The apparatus 2 in the figures is not to scale and is provided for purposes of illustration. In practice, the apparatus 2 is relatively longer than shown for the illustrated transverse dimensions. Further many of the elements are diagrammatically shown. The apparatus 2 automatically cooks the cheese curd forming the pasta filata and the final cheese product in a single continuous process. This process is accomplished without moving parts for conveying the curd through the cheese making apparatus 2. This is to be distinguished from the prior art processes in which the filata is placed in an auger apparatus for final kneading and processing.

In FIG. 2, apparatus 2 assembly 4 comprises an elongated outer tubular circular cylindrical conduit 10, preferably stainless steel sheet material. An inner elongated perforated tubular circular cylindrical conduit 12 is concentric within the outer conduit 10. The perforated conduit 12 has numerous small diameter apertures 14, e.g., 1–10 mm diameter, throughout as shown by portion 12', FIG. 2a. Conduit 12 in essence is an elongated pipe. Conduit 12 preferably is stainless steel. The outer conduit 10 may be, for example 8.5 inches in diameter and the inner conduit 12 may be 6.75 inches in diameter. The thickness and diameters of the conduit sheet material is not important and may have any desired values. The conduits 10 and 12 in this embodiment may have a length of about 100 inches.

The outer conduit 10 comprises a plurality of axially disposed conduit sections 16, 17 and 18 of identical conduit material and diameters. The number of sections is by way of example and may be more or fewer according to a given implementation. Top section 16 is attached to intermediate section 17 by connectors comprising a thermoplastic ring 20 and metal attachment rings 22, 24. Rings 22, 24 are preferably stainless steel and preferably welded to the edge of respective conduit sections 16 and 17. The connector rings 22 and 24 are bolted to each other by bolts (not shown).

Ring 20 extends flush from the outer periphery of the connecting rings 22 to the outer peripheral surface of inner perforated conduit 12, abutting the conduit 12 and holding it in the vertical orientation.

A second set of rings 22 and 24 are secured to the other edge of section 17 and an edge of section 18. A ring 20' identical to ring 20 is secured between these two rings 22 and 24 which are also bolted together. Ring 20' abuts the outer peripheral surface of the inner conduit 12 further holding the conduit in the vertical orientation.

The rings 20, 20' serve another purpose as well. The rings 20. 20' are fluid impervious and provide a fluid barrier to the chamber 26 between the inner conduit 12 and outer conduit 10. The rings 20. 20' thus subdivide the chamber 26 into a plurality of vertically aligned sub-chambers 26', 26" and 26'''. The sub-chambers 26', 26" and 26''' surround the inner conduit and are each in radially inward fluid communication with the inner fluid passageway 28 formed by the inner conduit 12. However, none of the sub-chambers are directly in fluid communication with each other in the vertical axial direction of conduit 12 axis 30.

A hopper 32 is disposed on inner conduit 12 for feeding by gravity the raw curds from the feed apparatus 8, FIG. 1, into the passageway 28. The hopper may also be stainless steel and is funnel shaped. The passageway 28 and the sub-chamber 26' are open at the top of the apparatus assembly 4.

The lowermost section 26''' of the outer conduit 10 has a radially outwardly extending annular flange 34. The inner conduit 12 has a similar flange 36. The flanges 34 and 36 are bolted to a steel plate 38 of bottom cheese feed assembly 40. Assembly 40 comprises a second plate 42 connected to plate 38 by funnel 44. The funnel 44 is sufficiently large at its upper mouth to receive final cheese product from the passageway 28 of the conduit 12. The funnel 44 tapers to a narrower discharge opening 46 which determines the diameter of the final cheese product exiting the passageway 28. For example, the opening 46 may be about 4–6 inches in diameter as desired. This provides a continuously generated cylinder of cheese product. The diameter of the final product is according to any desired value.

The funnel 44 at discharge opening 46 and plate 42 are connected to an elbow shaped pipe 48 via a further plate 49 for discharging the cylindrical cheese product 50 horizontally. A cutter 52 severs the product 50 into desired lengths which are collected in storage bin 54. The cheese product may be subject to further processing such as exposure to brine to salt the product and to a shredder (not shown), if desired. A thermometer or temperature gage 56, FIG. 1, is attached to funnel 44 for sensing the temperature of the final cheese product. The funnel 44 and pipe 48 may have their interior surfaces coated with a slippery thermoplastic material coating such as Teflon, a trademark of Du Pont Corp. (polytetrafluoroethylene).

A hot water manifold 56 receives hot water, e.g., 160° F. at inlet conduit 60. The manifold 56 distributes the hot water to a plurality of outlet pipes 62–76. In practice, while eight outlet pipes are shown, more or fewer may be provided in accordance with a given implementation. Each pipe 62–76 has a corresponding valve 62'–76'. These valves are individually adjusted to control the volume of water flowing through the respective corresponding outlet pipes in the direction of the arrows associated with the outlet pipes. This flow may be set from zero to a desired maximum value.

Pipes 62 and 64 are connected to the outer conduit 10 by fittings (not shown) for supplying hot water to the sub-chamber 26' at spaced axial locations in the sub-chamber 26'. Pipes 66, 68 and 70 are connected to the outer conduit 10 for supplying hot water to the sub-chamber 26" at axial spaced locations in this sub-chamber. Pipes 72–76 are similarly connected to the outer conduit 10 for supplying hot water to the sub-chamber 26''' in axial spaced locations in the sub-chamber. A sole hot water outlet 77 is connected to the outer conduit 10 to exhaust hot water from the uppermost sub-chamber 26'. The outlet 77 is adjacent to the top of the conduit 10. The water is pumped into and flows out of the chambers in the assembly 4 by pumps (not shown).

In FIG. 1, the support structure 6 comprises a tripod leg arrangement formed by legs 78. Three legs 78 are spaced equally about the assembly 4. Representative leg 78' comprises a radially outwardly extending steel support member 80. A vertical circular cylindrical steel rod 82 is secured to the end of member 80. A pair of steel lugs 84 are welded to the rod and member. The lugs 84 may be sheet material. The leg 78' comprises a pipe 86 having notches 90 at end 88. The notches 90 receive the lugs 84. The rod 82 releaseably fits within the core of the pipe 86. A caster 92 is at the other end of the pipe 86. The legs 78 thus are removable and provide rolling support for the assembly apparatus 2.

A further wheel assembly 94 extends radially outwardly from the conduit 10. A handle (not shown) is attached to conduit 10 on a side thereof diametrically opposite the wheel assembly 94. The handle is used in combination with the wheel assembly 94 to tilt the apparatus 2 to a horizontal orientation (not shown). As the assembly is tilted by holding the handle, the wheel assembly 94 is gradually lowered until it touches the ground. The apparatus may then be manually transported by the handle and wheel assembly by one person.

In operation, properly acidified raw cheese curd in a continuous feeding process is fed into the hopper 32 filling the conduit 12 passageway 28. Hot water is supplied to the pipes 62–76. The hot water is applied by the pipes to the sub-chambers 26', 26" and 26'''. The water in the sub-chambers can not flow directly vertically to the adjacent sub-chambers due to the presence of the rings 20 and 20'. These rings 20, 20' forces all of the inlet water to flow through the perforated inner conduit into the passageway 28 and mingle with the cheese curd. Excess water is removed at the outlet 77. Some of the water is absorbed by the curd and the temperature of the curd is raised to preferably about 135° F. simultaneously cooks the curd, i.e., generating the pasta filata, generally referred to herein as cooking.

The amount of water necessary to flow through each of the pipes 62–76 is determined empirically. The water and curd column in the passageway form a pressure head. This head is adjusted until the pressure at the base of the column at plate 38 is at least about 2 psi. It may be 4 psi or greater according to a given implementation. The various parameters of the process including the flow rate of the curd and the extent to which the pasta filata dough is cooked determine the final pressure.

A pressure gage (not shown) at the opening at the base of the passageway 28 may be used to measure this pressure. The value of the pressure may be adjusted by adjusting the amount of water flowing into the passageway from each of the pipes 62–76. This value is set by setting the valves associated with each inlet water pipe accordingly. Also, the temperature of the water determines the extent to which the product is cooked. This is also determined empirically. Some pipes may have no flow and others reduced flow relative to others. The pressure of the water is also adjusted at the source by a pressure regulator (not shown). The volume of water flowing to each of the sub-chambers is thus determined by examination of the quality and consistency of the final cheese product exiting the pipe 48.

The at least 2 psi pressure is believed optimum to insure continuous downward flow of the curd as it cooks. The pressure in the passageway 28 at the lowermost section corresponding to sub-chamber 26''' is highest and the pressure at the upper most section is the lowest. The at least 2 psi pressure determines the flow rate of the cheese curd through the passageway. This flow rate is solely caused by the force of gravity on the cheese curd and mass in the conduit 28. This flow rate is sufficient to insure the curd is fully cooked and the cheese is of the proper consistency.

The cheese mass flows smoothly in the conduit without moving parts to assist in the flow. The inner surface of the conduit 12 is smooth notwithstanding the presence of the perforations 14 (FIG. 2a). No curd is caught in the passageway as might occur in the prior art apparatuses. Further, a minimum of cream is extracted from the cheese providing an improved yield from the input curd.

The hot water preferably is recirculated and reheated by a heat exchanger (not shown). When the water is pumped into the sub-chambers, the pressure forces the water into the curd or cheese mass in the passageway 28. The water then passes through the curd to the outlet 77. American mozzarella cheese contains approximately 52% water as compared to 62% for mozzarella made in Italy. Normally, all sub-chamber are full of water. The water passing through the curd insures that the product is properly and uniformly moisturized and heated. The combined water and cheese/curd pressure head provides sufficient force to constantly move the mass into the funnel 44 and out of the outlet pipe 48. It is important that the final cheese product in the funnel 44 have a temperature of at least about 135° F.

The pressure at each hot water inlet 62–76 is adjusted so as to maintain the final cheese product temperature and quality. Certain of the water inlets may not have any water pressure as determined by a given process. This is acceptable. The pressure at each water inlet does not need to be the same and thus the water volume flowing at each inlet may differ.

The cylindrical cheese mass product is pliable as it exits the outlet pipe 48 and is severed by cutter 52 into desired length chunks or delivered to a molding machine (not shown). The chunks are stored in the bin 54. The chunks may also be subject to cooling (not show) and salting, if desired.

It is also preferred that to improve the quality of the cheese product that the curd in the passageway be stretched and mixed as it flows downwardly to the funnel 44. To provide such stretching and mixing, FIG. 6, a set of stretching and mixing bars 96, 98 and 100 are provided in the passageway 28. Bar 98 comprises a pair of bar elements 102 at right angles. The elements may be metal or thermoplastic rods of any cross section shape such as round, square, triangular, rectangular and so on. The bar 98 is fixed interior to the inner conduit 12 and extends across the passageway 28 transversely to the flow direction 104 of the curd and cheese mass. The bars may also be inclined relative to the axis 30. More or fewer transverse bars may be provided in a given or multiple planes as may be needed.

The bars 98 and 100 may be identical, but orientated at different angles relative to each other about the axis 30. The spacing of the bars from each other, their angular orientation about the axis 30 and the number of bars is determined for a given implementation. As the curd mass flows in direction 104, it encounters the bars which interrupt and redirect the mass flow causing a stretching and mixing action. This is a passive action in that no moving parts are employed. As the curd mass flows past each of the bars it encounters some churning. Each bar adds further churning to thus provide the desired mixing action. The final product quality determines the shape, orientation and number of stretching and mixing bars employed.

Figure 11:
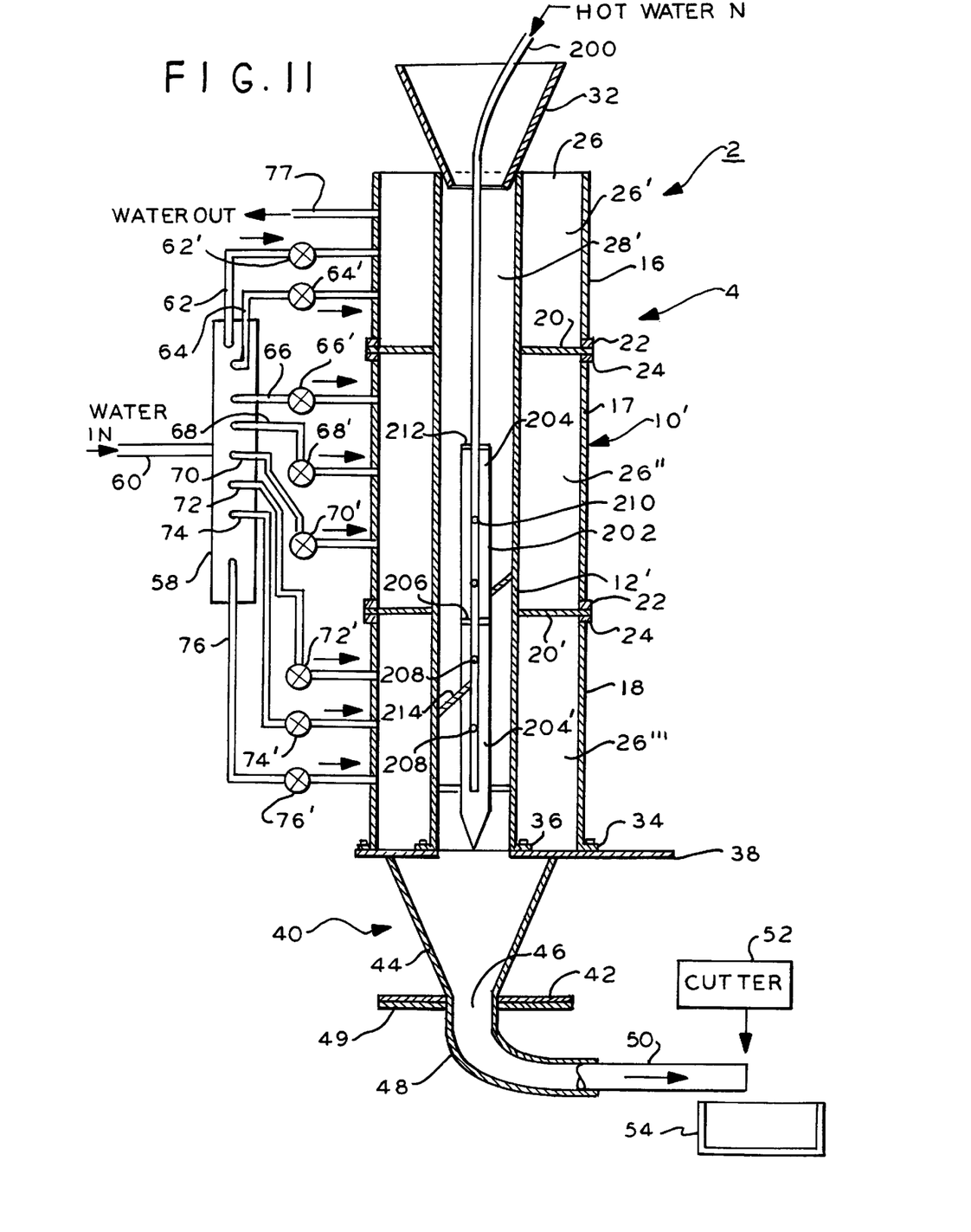
FIG. 11 a partially diagrammatic fragmented side elevation view partially in section of an apparatus according to a second embodiment of the present invention.

The apparatus shown and described in connection with FIGS. 1 and 2 may provide cheese at a rate of about 300 pounds per hour. In a larger scaled up apparatus, cheese may be produced at a rate of about 5000 pounds per hour. In this case the outer conduit 10', FIG. 11, may be 18 inches in diameter with an appropriately scaled up diameter perforated inner conduit 12'. While the reference numerals in FIG. 11 are the same as those in FIG. 2, it should be understood that the reference numerals in FIG. 11 refer to otherwise identical components in FIG. 2 except as scaled up in dimensions. In this case the outer conduit 10' and inner conduit 12' are represented by primed reference numerals. The inner conduit 12' forms a passageway 28'.

A hot water inlet pipe 200 is located within the passageway 28'. A further perforated inner conduit 202 is also located within the passageway 28'. The inlet pipe 200 is located within the inner core of perforated conduit 202. The conduit 202 is located adjacent to the lower sub-chambers 26" and 26'''. In other implementations the conduit 202 could be longer or shorter. The conduit 202 has a relatively small diameter as compared to passageway 28' so as to have minimum effect on the flow of cheese product through the passageway 28'. The conduit 202 has a plurality of inner sub-chambers 204 and 204' formed by fluid impervious ring 206 connected between pipe 200 and conduit 202 in the conduit 202 inner core region. The ring 206 is in this example medially the ends of the conduit 202 but could be at positions other than that shown.

While one medially located inner ring 206 is shown more or fewer may be included according to a given implementation. The pipe 200 in the conduit 202 sub-chambers 204 and 204' has two water outlet apertures 208 between the bottom of the conduit 202 and ring 206. The pipe 200 has further water outlet apertures 210 between upper fluid impervious ring 212 and intermediate ring 206. Ring 212 is at the top of the perforated inner conduit 202 forming the sub-chamber 204. Apertures 210 supply hot water at 160° F. to the sub-chamber 204 and apertures 208 supply hot water to the sub-chamber 204'. In this way, hot water is supplied to the interior of the cheese mass being produced which may not receive sufficient hot water from the manifold 58 in order to produce the higher volume cheese product.

More sub-chambers may be provided in accordance with the flow rate and mass of the cheese product through the passageway 28'. Also, inclined cross members 214 (one being shown) may be provided for additional stretching of the pasta filata during its passage through the chamber 28' and adding turbulence if desired. The cross member 214 extends into the sub-chamber 204' and across a portion of the passageway 28' for adding turbulence to the hot water and which turbulence may be further enhanced with an enlarged opening through the perforated conduit 202. The lowermost tip of conduit 202 is conical to provide additional room for the pasta filata to exit the passageway 28' into the funnel 44.

Figure 4:
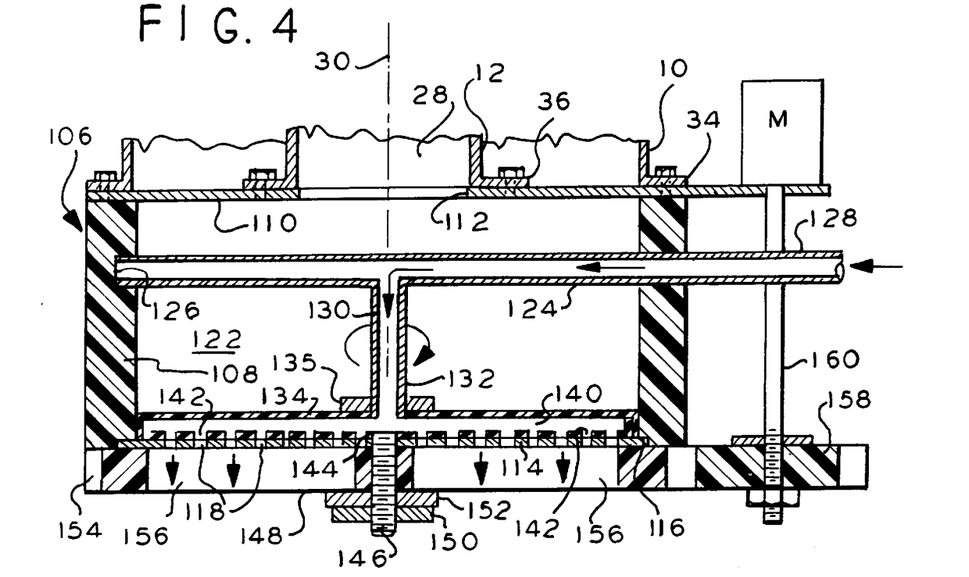
FIG. 4 is a sectional side elevation view of a shredding apparatus for use with the embodiment of FIG. 1.

The final cheese product chunks may be shredded if desired. However if shredding is desired, a shredder 106, FIG. 4, is preferred in a continuous process. Shredder 106 comprises a circular cylindrical housing 108 which may be engineered high temperature resistant thermoplastic material such as Delrin or Ultem thermoplastics. The housing 108 is bolted to flanges 34 and 36 of the outer conduit 10 and inner conduit 12 through preferably stainless steel plate 110. Plate 110 has a central opening 112 aligned with passageway 28. A perforated plate 114 is fixed stationary to the housing 108 at annular shoulder 116 distal the plate 110. Plate 114 has an array of final cheese portion forming apertures 118.

Figure 8:
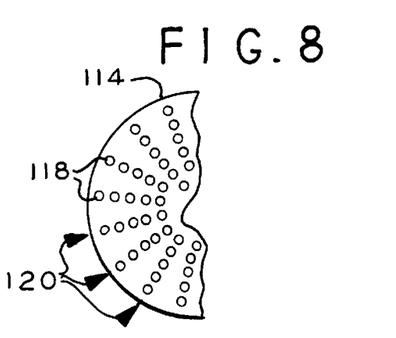
FIG. 8 is a fragmented plan view of a perforated plate for use in the embodiment of FIG. 4.
Figure 9:
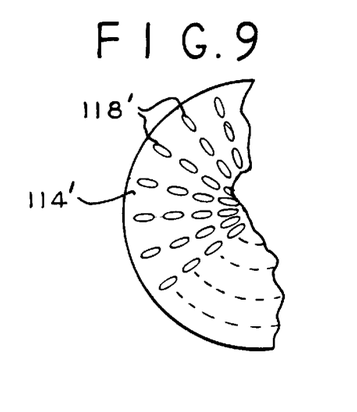
FIG. 9 is a fragmented plan view similar to that of FIG. 8 of a further embodiment of the perforated plate.
Figure 10A:
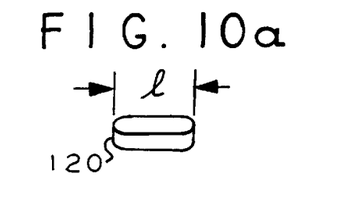
FIGS. 10a and 10b are isometric views of cheese particles produced by the plates of respective FIGS. 9 and 8.
Figure 10B:
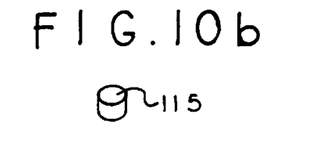

In FIG. 8, the apertures 118 are arranged in radially aligned arrays 120. The number of apertures in a plate is determined by a given plate 114 diameter and the size of the apertures 118. The plate 114 thickness and area of each of the apertures 118 determines the mass and dimensions of the shredded cheese particles. The plate 114 may be for example ¼ inch thick stainless steel. The resulting circular cylindrical shredded pieces 115, FIG. 10*b*, may be about 0.2 to 1.5 grams. In this embodiment. The apertures 118 are circular cylindrical. However, the apertures may be of other shapes as desired. For example, in FIG. 9 apertures 118' in plate 114' may be elongated. The length of the apertures 118' determines the length l of the cheese pieces 120 produced, FIG. 10a. This length is set in different plates to provide shredded pieces of the desired dimensions.

The housing 108 has a chamber 122 between the plates 110 and 114. A linear stainless steel pipe 124 has one end secured fixed in a recess 126 in the housing 108 wall and the other end 128 passes through the housing 108 diametrically opposite the recess 126. A right angle second stainless steel pipe 130 is secured to pipe 124 concentric on axis 30. The core of pipe 130 is in fluid communication, e.g., air, with the core of pipe 124. The lower end 132 of pipe 130 forms a spindle.

Figures 3, 5, 5A:
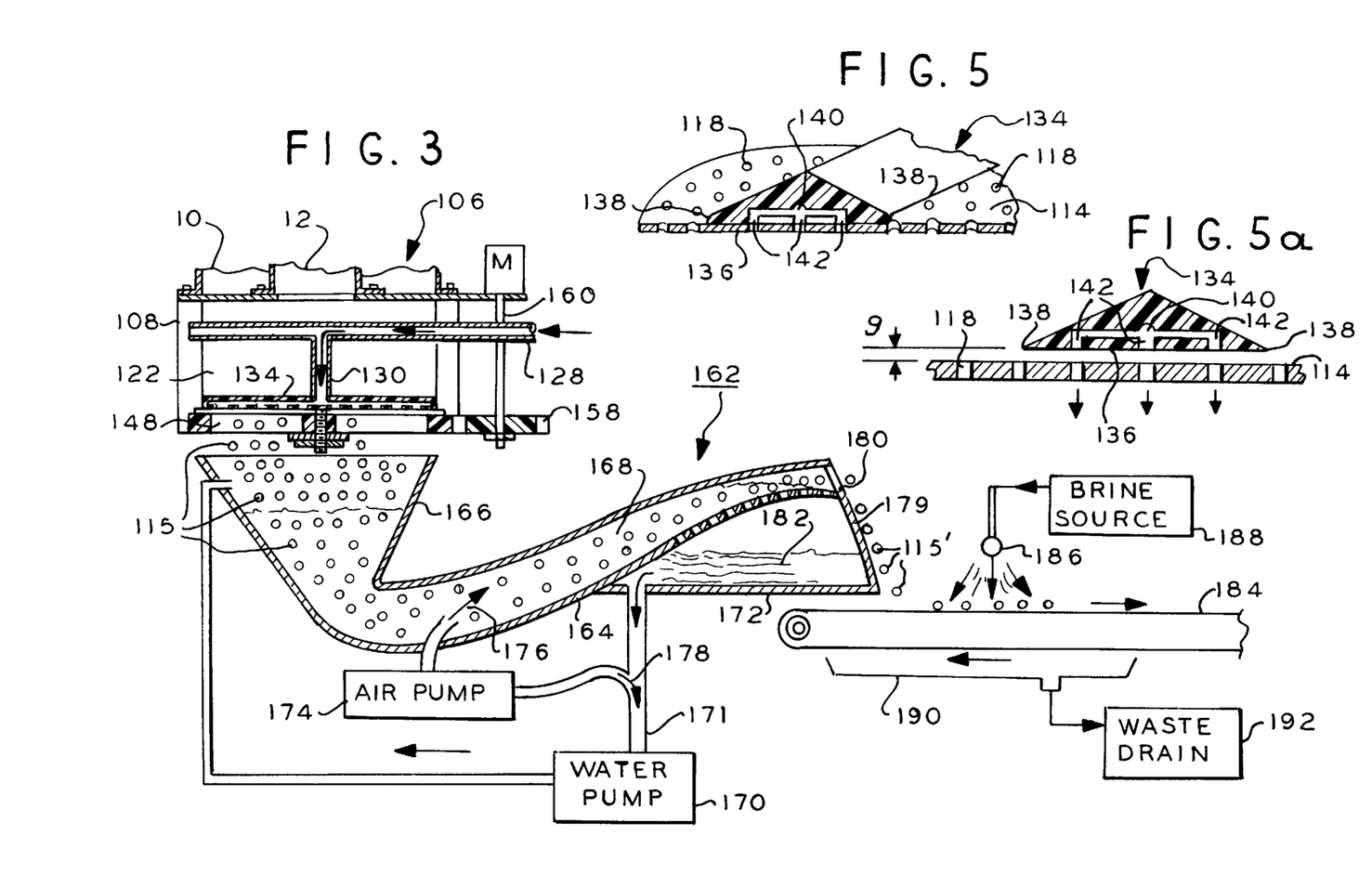
FIG. 3 is a sectional fragmented elevation view of a cooling apparatus in a further embodiment of the present invention.
FIGS. 5 and 5a are isometric sectional end elevation and sectional end elevation views of a blade used in the embodiment of FIG. 4.

A blade 134 is rotatably secured to the spindle of pipe 130 and abuts a disc-like boss 135 secured about pipe 130. Blade 134 extends entirely across the chamber 122, abutting the sides of the housing 108 in the chamber. The blade 134 is thermoplastic material such as Delrin and Ultem. The blade 134 may be molded or machined. In FIGS. 5 and 5a, the blade 134 is triangular in transverse section. The blade 134 has a surface 136 which faces the plate 114. The surface 136 terminates at opposing longitudinally extending product severing edges 138. A longitudinally extending internal conduit 140 extends for the length of and within the blade 134 terminating adjacent to the ends of the blade 134. Conduit 140 is in fluid communication, e.g., air, with the core of pipe 130, FIG. 4.

The blade 134 has an array of apertures 142 in fluid communication with the conduit 140 and with the chamber 122 through the surface 136. The apertures 142 are aligned with certain of the apertures 118 of the fixed plate 114. There are three rows of apertures 142 in the blade 134. As the blade rotates about axis 30, FIG. 4, the apertures 142 periodically aligns with a corresponding array of apertures 118. As best seen in FIG. 5a, the surface 136 is spaced from the plate 114 a small gap g. The gap g may be about 0.002 inches for example.

Figure 7:
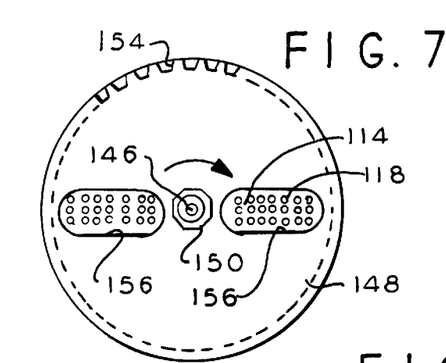
FIG. 7 is a partial bottom plan view of the shredding apparatus of FIG. 4.

A nut 144, FIG. 4, is embedded in the surface 136 of the blade 134. A stud 146 is threaded to the nut 144. A drive plate 148 is secured to stud 146 by nut 150 and washer 152. Drive plate 148 may be thermoplastic material such as Delrin or Ultem for example. The nut 150 secures the plate 148 against the fixed plate 114. Plate 148 rotates about axis 30. Plate 148 and blade 134 rotate in synchronously. An array of gear teeth 154 are formed in the outer periphery of the plate 148. The plate 148 has two mirror image identical radially extending through slots 156. The slots 156 are each dimensioned to expose three radial arrays of apertures 118 as the plate 148 rotates, FIG. 7. The blade 134 is aligned axially with the slots 156 at all times. As the blade rotates, the slots 156 rotate aligned with the blade.

A motor M is mounted on plate 110. A gear 158, FIG. 4, is secured to motor M drive shaft 160. Gear 158 meshes with the teeth 154 for rotating the plate 148 about the axis 30.

A pressurized air or water source (not shown) supplies pressurized air or water to the pipe 128 in the direction of the arrows. This pressurized fluid is supplied to the blade 134 conduit 140 as the blade 134 is rotated by the rotating plate 148. This fluid is forced out of the blade apertures 142 in pressurized jet streams and selectively through the plate 114 apertures 118 as the apertures 118 align with the rotating blade apertures 142. These jet streams force cheese seated in the apertures 118 out of these apertures. The cheese is forced into the apertures 118 by the pressure head discussed above.

As the blade rotates, it severs the seated cheese product in the apertures 18 from the cheese in the chamber 122. The severed cheese is then blown out of the plate 114 through the slots 156 in the drive plate 148. The plate 148 prevents other seated cheese pieces from exiting the plate 114 until the blade and slots 156 are aligned. This ensures uniform piece size. This uniformity provides a high quality product. Once the cheese pieces 115 are formed, it is desired in a continuous process to cool the pieces still at about 135° F. to room temperature and salt the cheese.

In the prior art the formed cheese is first formed as a pliable mass in chunks which may be about 12 pounds. The chunks are placed in brine tank for about 2 weeks so the cheese may absorb salt. This is a slow process. The cheese may be cut into smaller 8 oz. chunks. These chunks are then placed in a brine tank. The smaller size cheese needs about ½ hour to absorb the salt. This is also slow and time consuming.

In FIG. 3, an apparatus is shown wherein the shredded cheese is continuously salted as it is produced, the salting occurring in a matter of a few seconds because the pieces are relatively small. Cooling apparatus 162 includes an inlet funnel 166 having a reduced diameter or transverse area exit funnel 164. The funnel 166 receives pieces 115 of cheese from the shredder 106 by gravity. The received pieces 115 flow from the inlet funnel 166 into the exit funnel 164. The trough 164 is filled with cooling water 168 at a temperature of about 45° F. A refrigeration system (not shown) cools the water. A pump 170 pumps cooling water from a collecting tank 172 to the inlet funnel 166, recirculating the water. The cheese discharge end of the funnel 164 above the tank 172 is partially perforated to allow water to return to the tank 172. This perforated region may be a screen for example.

Tank 172 has an inclined side wall 179 along which the discharged pieces 115' fall. The wall 180 may also be partially perforated to return cooling water to the interior of the tank 172. Water 182 collects in the tank 172 from the funnel 164.

An air pump 174 pumps air jets 176 and 178 respectively into the funnel 164 and pump 170 inlet pipe 171. The jets 176 form a venturi effect to convey the pieces 115 up the inclined funnel 164 to the funnel edge 180. The jets 176 forcibly move the pieces along the funnel 164 as the pieces cool. The jets 178 assist in draining water 182 from the tank 172. The cooled water 182 is returned to the funnel 166 by the pump 170. Not shown is a refrigeration system as may be needed for cooling the air pumped by pump 174. The jets 176 may also cool the water 168.

The conveyed cooled pieces 115' exit the funnel 164 through a discharge port and then drop onto conveyor 184 over edge 180. The conveyor 184 passes the pieces 115' beneath a brine sprayer 186 which sprays streams of brine from source 188. The sprayed brine is collected by a trough 190 and fed to a waste drain 192. The pieces 115' are salted in a matter of a few seconds as compared to 30 minutes and longer for the prior art salting processes. Not shown is a freeze system for freezing and packaging the shredded pieces.

Thus there has been shown and described apparatus for making Italian cheese without moving parts and for shredding the cheese in one continuous process. The process includes cooling and salting the shredded cheese. The product is more uniform than that produced by prior art processes. The disclosed apparatus provides improved yield while providing enhanced quality. The product is produced with a minimum of moving parts needed only for the shredding process. The cheese forming apparatus are all static elements.

As the cheese product exits the apparatus, the hot water at inlet 60, FIG. 2, flows throughout the chambers and sub-chambers and interior of the conduits 10 and 12 providing uniform pressure to the end of the cheese production. The apparatus is easy to clean. The cleaning process may use a cleaning solution (not shown) circulated via the water inlet and outlet via manifold 58. The cheese outlet pipe 48 is closed for cleaning after product is removed by a movable gate, metal or plastic, (not shown) at plate 38. The cleaning solution is circulated through the aggregate components for 10 minutes to accomplish a cleaning in place. This results in a much faster turnaround of cleaning cycles than in the prior art apparatuses.

It will occur to one of ordinary skill that various modifications may be made to the disclosed apparatus. The disclosure is intended to be illustrative and not limiting. The appended claims are intended to define the invention. For example, the number and location of the sub-chambers, the materials employed, the number and location of the hot water inlets, the pressures and temperatures given are all by way of illustration. The arrangement of the shredder components is also by way of illustration. Other apparatus may be provided for supplying jet streams to the perforations to sever and eject shredded product therefrom in a continuous process. In addition, the pasta filata formed by the present invention may be seated into a prescribed cavity without pressure, i.e., without external pumping action, by separating preformed mini-portions, i.e., shredding, from the bulk. The mini-portions are cooled and salted immediately automatically and discharged for subsequent processing such as freezing.

What is claimed is:

1. A cheese producing apparatus comprising:
   conduit means for receiving acidified milk curd, the conduit means including means for passively conveying the received curd though the conduit means without moving parts via a gravity induced pressure head formed by the received milk curd; and
   means coupled to the conduit means for cooking said curd during said conveying to produce pasta filata from the curd;
   said conduit means including at least one conduit oriented vertically for providing said gravity induced pressure head of said curd in a column in said at least one conduit to cause said curd to vertically downwardly displace in response to said pressure head.

2. The apparatus of claim 1 wherein the at least one conduit comprises an outer cylindrical conduit and an inner perforated cylindrical conduit spaced from the outer conduit, the inner conduit comprising a tubular pasta filata forming chamber for receiving said curd and means coupled to the outer conduit for orienting the inner and outer conduits vertical.

3. The apparatus of claim 2 wherein the conduits have an upper end and a lower end, the means for cooking including hot water inlet means for injecting hot water intermediate said ends into the outer conduit for cooking said curd in said inner conduit and water outlet means situated at a vertically higher elevation than said inlet means for exhausting at least a portion of said injected water.

4. The apparatus of claim 1 wherein said at least one conduit has a length sufficient to produce a pressure head of at least about 2 psi.

5. The apparatus of claim 3 wherein the inner and outer conduits form an annular chamber therebetween, further including fluid impervious means in said annular chamber for dividing said annular chamber into a vertical array of annular sub-chambers, each being in vertical substantial fluid isolation from an adjacent sub-chamber in a direction along said chamber, said sub-chambers each for receiving said injected hot water.

6. The apparatus of claim 5 wherein said inlet means includes means for injecting said hot water into selected ones of said sub-chambers.

7. The apparatus of claim 3 wherein the hot water has a temperature of about 160° F.

8. The apparatus of claim 3 including means coupled to said conduits for insuring injected hot water passes through the inner conduit perforations into said inner conduit chamber in order to flow to said outlet means.

9. The apparatus of claim 5 wherein said hot water injection means comprises a manifold for receiving said hot water and a plurality of manifold outlets, each manifold outlet for supplying hot water to a corresponding sub-chamber.

10. The apparatus of claim 9 including means for adjustably setting the amount of water flowing through each said manifold outlets.

11. The apparatus of claim 1 including shredding means connected to the conduit means for shredding the cheese pasta filata as the cheese pasta filata is produced in a continuous process.

12. The apparatus of claim 11 wherein said shredding means includes a cheese pasta filata receiving chamber for continuously receiving a moving mass of produced cheese pasta filata, a fixed perforated plate of a given thickness and having perforations each of a given transverse area for receiving and depositing the received cheese into the plate perforations, a rotatably mounted blade in said chamber adjacent to said perforated plate for severing the moving cheese pasta filata mass from the received cheese pasta filata in said plate perforations and a further plate external said cheese receiving chamber with an opening aligned with said blade, and means for synchronously rotating the blade and the further plate.

13. The apparatus of claim 12 wherein said blade includes fluid conduits, each for successive alignment with a different perforation in said perforated plate as the blade rotates, and further including fluid means for causing fluid streams to flow through said blade fluid conduits and aligned perforations to eject the received shredded cheese pasta filata from said fixed perforated plate perforations.

14. The apparatus of claim 11 further including cooling means for cooling said cooked shredded cheese pasta filata comprising a funnel for receiving the shredded cheese pasta filata, means for flowing water through the funnel for cooling the shredded cheese pasta filata, first means for conveying the cooled shredded cheese pasta filata from the funnel, second conveying means for receiving and conveying the cooled cheese pasta filata, and brine spray means for salting the cooled cheese pasta filata during conveying by said second means.

15. The apparatus of claim 1 including stationary means for mixing and stretching the cheese pasta filata as it is conveyed.

16. A cheese pasta filata shredding apparatus comprising:
   a housing forming a chamber for receiving a moving mass of cheese pasta filata;
   a perforated plate of a given thickness and having perforations each of a given transverse area secured to the housing for receiving and shredding cheese pasta filata from the chamber, said thickness and area defining the mass of the shredded cheese pasta filata particles;

a blade rotatably secured to the housing in said chamber and adjacent to said perforated plate for severing the cheese pasta filata mass in the chamber from the received cheese pasta filata in the perforations;

a second plate external the chamber adjacent to the perforated plate, said second plate having a slot therein aligned with the blade for receiving shredded cheese pasta filata passing through the perforated plate; and means for synchronously rotating the blade and second plate.

17. The apparatus of claim 16 wherein said blade includes fluid conduits each for successive alignment with a different perforation in said perforated plate as the blade rotates, and further including fluid means for causing fluid streams to flow through said blade fluid conduits and aligned perforations to eject shredded cheese pasta filata from said fixed perforated plate aligned perforations.

18. A cheese pasta filata producing apparatus comprising:

an outer cylindrical conduit having a longitudinal axis oriented vertically;

an inner cylindrical perforated conduit within and extending along the length of the outer conduit forming a central cheese pasta filata forming chamber and an outer chamber between the inner and outer conduits, said cheese pasta filata forming chamber for receiving raw curd;

fluid impervious means for dividing the outer chamber into a plurality of sub-chambers surrounding the inner conduit;

means for inputting hot water into selected sub-chambers, said hot water for passing through the inner conduit and into the received curd for cooking said received curd to produce cheese pasta filata;

said conduits having a length such that the mass of the curd and water produces a pressure head sufficient to convey the produced pasta filata to and through the bottom of said inner conduit; and means for exhausting excess of said hot water.

19. The apparatus of claim 18 including valve means for controlling the amount of hot water injected into each said sub-chambers.

20. The apparatus of claim 19 wherein the cheese pasta filata is produced in a continuous process, further including shredding means coupled to said conduits for continuously shredding the pasta filata at the bottom of said conduits.

21. A method for producing cheese comprising:

passively conveying received acidified curd though a conduit oriented vertically for providing a gravity induced pressure head of said received curd in a column in said conduit to cause said curd to vertically downwardly displace in response to said pressure head without moving parts; and cooking said curd during said conveying to produce cheese pasta filata from the curd.

22. The method of claim 21 including continuously conveying said curd and continuously producing said cheese pasta filata.

23. The method of claim 22 including shredding said cheese pasta filata as it is being produced.

24. The method of claim 23 including continuously cooling said shredded cheese pasta filata after said shredding.

25. The method of claim 24 including continuously salting the shredded cooled cheese pasta filata.

26. A method for continuously forming pasta filata comprising:

continuously cooking raw prepared curd at a temperature of about 135° F. to continuously form bulk pasta filata without augers;

continuously forming the bulk cooked curd into substantially uniform filata cheese mini-portions of approximately 0.2 to 1.5 grams; and automatically cooling and salting the mini-portions.

27. A cheese producing apparatus comprising:

conduit means for receiving acidified milk curd, the conduit means including means for passively conveying the received curd though the conduit means without moving parts via a gravity induced pressure head formed by the received milk curd, said conduit means including at least one conduit oriented vertically for providing said gravity induced pressure head of said curd in a column in said at least one conduit to cause said curd to vertically downwardly displace in response to said pressure head;

means coupled to the conduit means for cooking said curd during said conveying to produce pasta filata from the curd; and shredding means connected to the conduit means for shredding the cheese pasta filata as the cheese pasta filata is produced in a continuous process.

* * * * *